W. J. Stowell.
Nut Fastenings.
No. 81,030.   Patented Aug. 11, 1868.
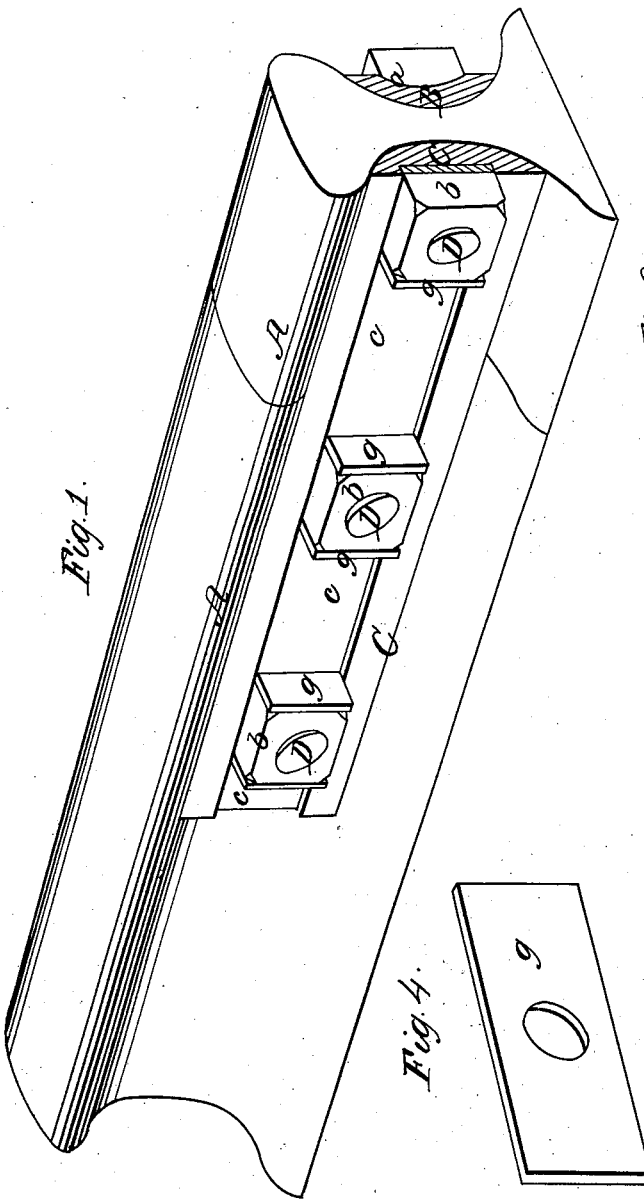
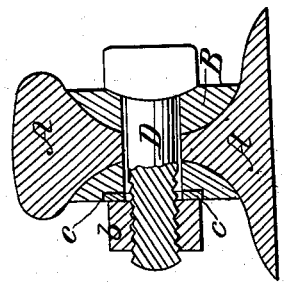
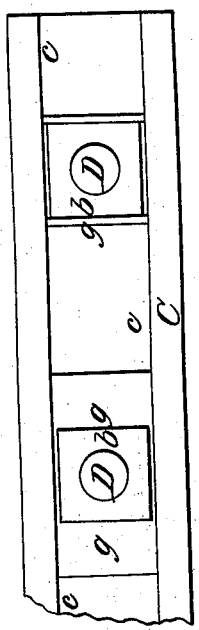
Witnesses:
R. J. Campbell
Edw. Schafer
Inventor:
Wm. J. Stowell
by
Mason Fenwick & Lawrence

United States Patent Office.

WILLIAM J. STOWELL, OF BALTIMORE, MARYLAND.

Letters Patent No. 81,030, dated August 11, 1868.

---

IMPROVEMENT IN LOCK-NUTS.

---

*The Schedule referred to in these Letters Patent and making part of the same.*

---

TO ALL WHOM IT MAY CONCERN:

Be it known that I, WILLIAM J. STOWELL, of Baltimore, in the county of Baltimore, and State of Maryland, have invented a new and improved Mode of Locking Nuts; and I do hereby declare that the following is a clear, full, and exact description thereof, reference being had to the accompanying drawings, making a part of this specification, in which—

Figure 1 is a perspective view, showing portions of two sections of railroad-rails spliced together, and having my improved nut-lock applied.

Figure 2 is a side view of a rail-splice, showing two nuts applied to bolts which pass through it, one of which nuts is locked, and the other is in a position for being locked, by turning up the ends of the washer shown behind it.

Figure 3 is a cross-section of a rail and splice-bars, showing a mode of securing the head of a bolt, as well as its nut, from turning.

Figure 4 is a perspective view of the washer before it is bent.

Similar letters of reference indicate corresponding parts in the several figures.

The object of this invention is to furnish a very simple and effective means whereby nuts, when set up tightly upon bolts, can be safely locked, and prevented from becoming casually loose, at the same time rendering it very easy to loosen and unscrew the nuts when desired to remove their bolts.

The nature of my invention consists in the employment of a washer of greater area than that of the nut for which it is intended, and in seating such washer into a recess which is formed in the surface of the object against which the nut is to be set up, so that when the nut is screwed up tightly upon its bolt, and one or more edges of said washer are turned up against the edge or edges of the nut, the latter will be securely locked in place, as will be hereinafter described.

To enable others skilled in the art to understand my invention, I will describe one practical mode of carrying it into effect.

In the accompanying drawings, 1 have represented my invention applied to bolts which are used for securing together the ends of railroad-rails, but I shall not confine myself to this application of my invention, as it will be found useful wherever it is desired to prevent a nut from working loose upon a bolt.

A A represent the ends of two sections of railroad-rail, which are secured together by means of two splices or fishing-bars, B C, placed on the sides of the sections, under the lips thereof, and confined against the necks of these sections by means of bolts D D passed transversely through them, as shown in figs. 1 and 2. This is one of the oldest and simplest modes of securing together railroad-rail sections at their joints.

The bar B is rolled or otherwise constructed, with a score or groove, *a*, in its face, extending throughout its length, into which are fitted the heads of the bolts D D, which latter are slightly rounded for this purpose. Instead of the curved score or groove *a*, a rectangular groove may be made, which will receive a square-headed bolt, thus rendering it unnecessary to round the abutting surfaces of the bolt-heads.

The bar C, which is secured upon the opposite side of the rail to the bar B, and against which the nuts *b b* are screwed, is constructed with a rectangular groove, *c*, in its face, extending throughout its length, which groove may be made of any desirable width and depth.

The groove which I have represented in this bar C is made slightly wider than the width of the nuts *b*, but it may be made narrower than these nuts, if found necessary.

The object of this groove *c* is to receive and hold in place a washer, *g*, which is a thin, rectangular plate, of such width as to fit snugly into the groove *c*, and having a hole through it, as shown in fig. 4.

This plate is slipped upon a bolt, and seated into the recess or groove *c*, after which a nut is applied upon the bolt and set up tightly. The projecting ends of the plate *g* are then bent outward, and driven snugly against the sides of the nut, as shown in fig. 1, thus forming a lock which will prevent the nut from becoming loose. The plate *g* may be equal to or greater or less in thickness than the depth of the groove *c*, and it may be made of such length as to have only one of its ends turned up to form a lock.

The drawings represent the locking-plates $g$ applied in a groove, which is in the plane of the rail's length, but, if desirable, the said plates may be applied in grooves, which are made at right angles to the length of the rail or its bar C.

I prefer to have the groove $c$ run in a direction with the length of its bar, C, for the reason that this groove can be much easier made, in the act of rolling said bar, than the vertical or transverse grooves.

To remove a nut, $b$, from a bolt, after it has been locked, as above set forth, it is only necessary to press the end or ends of the plate $g$ down into the groove $c$, which will allow the nut to be unscrewed.

I am aware that it is not new to employ washer-plates held by means of two or more bolts in a line, and having portions of their edges notched and upset against nuts, for the purpose of locking the nuts in place, and therefore I do not lay claim broadly to the broad principle of turning up a portion of a fixed washer-plate, after a nut is screwed home, so as to prevent such nut from turning or unscrewing.

I consider my improvement to be much simpler, cheaper, and susceptible of a more general application than the nut-locking devices heretofore employed or essayed, involving no change whatever in the present construction of bolts and nuts, and only requiring the use of a thin perforated plate of wrought metal, and a groove or recess made in the object against which a nut is required to be screwed.

Having described my invention, what I claim as new, and desire to secure by Letters Patent, is—

The locking-plate $g$, having plane surfaces, in combination with a grooved seat, $c$, both constructed substantially as described, and serving the purpose of fastening nuts upon bolts, as set forth.

W. J. STOWELL.

Witnesses:
    JONA. J. CHAPMAN,
    MAX LINDAU.